United States Patent [19]

Tobita et al.

[11] Patent Number: 4,667,866

[45] Date of Patent: May 26, 1987

[54] CAR BODY ASSEMBLING APPARATUS AND METHOD

[75] Inventors: Hideaki Tobita; Kazuo Naruse, both of Toyota, Japan

[73] Assignee: Toyota Jidosha Kabushiki Kaisha, Aichi, Japan

[21] Appl. No.: 748,188

[22] Filed: Jun. 24, 1985

[30] Foreign Application Priority Data

Jun. 26, 1984 [JP] Japan ................ 59-131271

[51] Int. Cl.$^4$ ............ B23K 9/12; B23K 37/04
[52] U.S. Cl. ...................... 228/4.1; 901/42; 228/6.1; 228/49.1; 228/47; 219/79; 29/430; 29/824
[58] Field of Search ............. 228/4.1, 47, 6.1, 49.1; 219/79, 80; 901/6, 7, 8, 42; 29/822, 823, 824, 430

[56] References Cited

U.S. PATENT DOCUMENTS

| | | | |
|---|---|---|---|
| 2,779,092 | 1/1957 | Gordon | 29/430 |
| 4,162,387 | 7/1979 | DeCandia | 219/79 |
| 4,400,607 | 8/1983 | Wakou et al. | 219/79 X |
| 4,404,451 | 9/1983 | Niikawa et al. | 228/47 X |

FOREIGN PATENT DOCUMENTS

| | | | |
|---|---|---|---|
| 2810822 | 9/1978 | Fed. Rep. of Germany | 228/47 |
| 103755 | 8/1979 | Japan | 228/47 |

Primary Examiner—Nicholas P. Godici
Assistant Examiner—Carmine Cuda
Attorney, Agent, or Firm—Kenyon & Kenyon

[57] ABSTRACT

Different car body parts needed for a complete main body are preworked at a subassembly station and then are releasably attached to corresponding jig units, each unit having a universal frame on which is mounted a set of special jigs conforming to the kind and type of car body being produced. Each jig unit is moved by an independent conveyor to a main assembly station where it is transferred to a corresponding positioning device. Each positioning device then moves its respective jig unit from a first position to a second position predetermined so as to place the different body parts in proper juxtaposed relation for welding by automatic welding devices. Upon welding, the jig units are released from all of the body parts except the under body, are retracted by their respective positioning devices, and are transferred back to their individual conveyors for return to the subassembly station. The completed car body is moved to a succeeding work station, where the under body jig unit is released and returned to the subassembly station.

10 Claims, 9 Drawing Figures

CAR BODY ASSEMBLING APPARATUS AND METHOD

BACKGROUND OF THE INVENTION

1. Field of the Invention

The present invention relates to an apparatus for assembling a car body on an assembly line and, more particularly, to an apparatus capable of assembling main bodies of cars of various kinds or types.

2. Description of the Prior Art

To assemble the main body of a car, the prior art resorts generally either to equipment of a special machine type or to equipment of a circulating jig type. In the special machine type, a plurality of assembly stages are each equipped with special jigs for each kind or type of car, to receive and assemble body parts. Equipment of the circulating jig type is equipped with jig trucks specifically for each kind or type of car, the jig trucks being circulated while being loaded with the body parts, so that the necessary jig trucks may be brought into a single assembly station to assemble the proper body parts for each car body.

More specifically, the special machine type of equipment is provided at one assembly station, as shown in FIG. 8, with a first jig 51 for under bodies and a pair of second jigs 52 (one one shown) for side bodies. The first jig 51 is loaded with an under body A by successive upward-forward-downward-backward movements of a transfer machine which is equipped with a transfer bar 53; whereas each of the second jigs 52 is loaded with a side body B from an overhead conveyor (not shown) by tilting an openable frame 54 supporting said second jig 52. Upon completion of the positioning operations of the aforementioned first and second jigs 51 and 52, the under body A and the side bodies B are then assembled by welding means (not shown) which is composed primarily of a welding gun provided especially for this purpose.

After completion of these assemblies, the partly assembled body is shifted to a next station where a car roof C is fed downward from a roof conveyor 55 and is assembled to the side bodies. After this, sub-body parts such as a cowl, an upper back, and a lower back are fed at different stations from special conveyors similar to the roof conveyor 55 and are added to the assembly until the main body is completed.

On the contrary, the jig circulating type of equipment is provided, as shown in FIG. 9, with a first jig truck 56 for the under body and a pair of second jig trucks 57 (only one shown) for the side bodies such that they circulate in separate loops independently of each other. The first jig truck 56 moves on a floor 58, while carrying an under body A to an assembly station; whereas the second jig trucks 57 move is suspended states, while carrying the side bodies B to the assembly station. At this assembly station, as shown, the first jig truck 56 and the second jig truck 57 are connected so that the under body A and the side bodies B then can be assembled by welding means. After this assembly, the roof C and the sub-body parts are assembled in the same way as with the aforementioned special machine type of equipment in accordance with predetermined steps until the main body is completed.

In the special machine type of equipment, the kinds of cars handled by one set of jigs are restricted more or less to a single body type (such as sedan, van, or coupe body models) and can be interchanged only by replacing the jigs 51 and 52. The special machine type of equipment presents a problem, therefore, in that it is poorly adapted to handle more than one car body model or to accommodate design changes for producing a new model car.

On the other hand, the jig circulating type of equipment is able to accommodate a plurality of car kinds and types merely by changing the loading orders for the jig trucks 56 and 57. Because the parts are positioned for assembly only by connecting the jig trucks 56 and 57, however, the jig circulating type equipment has the problem that the positioning accuracy is likely to have a large tolerance. Also, a number of jig trucks have to be prepared for the circulating conveyor.

A further problem shared by both of the aforementioned two types of equipment, is that the large number of assembly stations increases the cost and space for facilities and makes it impossible to achieve the desired productivity increase.

SUMMARY OF THE INVENTION

It is, therefore, an object of the present invention to provide a car body assembling apparatus which can assemble and produce numerous kinds of main bodies highly accurately and can adapt to changes in the car kinds and types without difficulty.

According to the present invention, there is provided a car body assembling apparatus which comprises: jig units for each body part, each jig unit having special sets of jigs for different car kinds and types removably mountable on a universal support frame; main body assembling means, including means for positioning said jig units and welding means carried on said positioning means for welding body parts; and conveyor means adapted either to circulate in a loop or to move reciprocally between a subassembly station and said main body assembling means for loading said main body assembling means with jib units for the body parts needed for assembling a main body of a car.

These body parts are intended to include under bodies, side bodies, and sub-body parts, the sub-body parts including roofs, cowls, upper backs, and lower backs. Moreover, the jig unit, the positioning means, and the conveyor means are provided independently of one another for each of the under bodies, the right and left side bodies, and the sub-body parts. Incidentally, those jig units and positioning and conveyor means for the sub-body parts can be further divided into a plurality of groups.

The car body assembling apparatus according to the present invention is able to assemble a plurality of parts at one station by making the assembly steps intensive. In this assembly, the jig units, loaded with the under body, right and left side bodies, and sub-body parts of the car kind and type intended, are brought into the main body assembling means, and those body parts are then positioned with respect to one another by the positioning means and are assembled by the welding means.

The car body assembling apparatus having the construction described above can assemble numerous kinds of main bodies irrespective of the car kinds and types by bringing the necessary jig units suitably into the main body assembling means.

Moreover, each of the jig units can have any one of the special sets of jigs for the different car kinds and types mountable on a universal or common support frame, so that it can easily accommodate changes in the car kinds and types to be produced and production of new car kinds merely by replacing one set of jigs with another set.

Still further, the use of a common frame improves positioning accuracy to enhance the quality of the product, and the production cost for main bodies can be lowered by reducing the number of assembly stations and facilities.

DESCRIPTION OF THE PREFERRED EMBODIMENT

Figure 1:
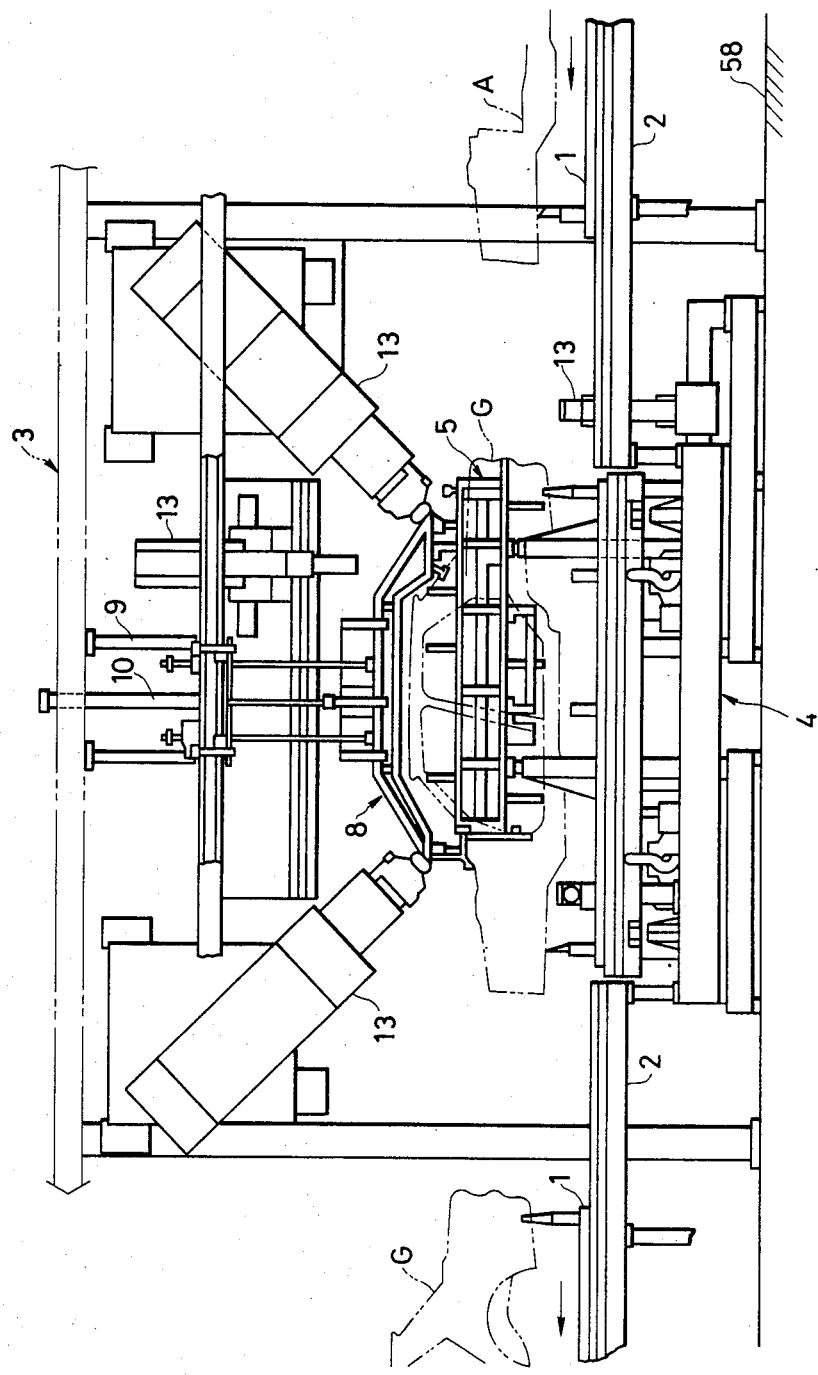
FIG. 1 is a side elevation view showing the structure of an essential portion of a car body assembling apparatus according to the present invention, with a portion being cut away.
Figure 2:
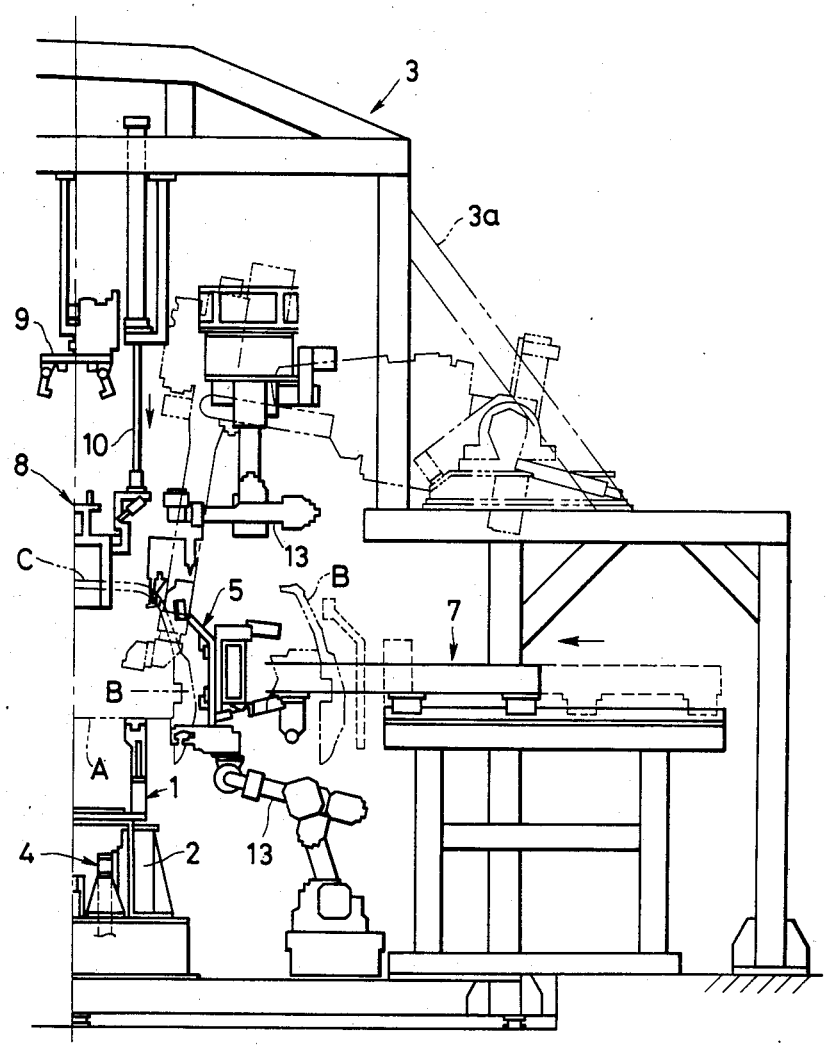
FIG. 2 is a front elevational view showing the structure of FIG. 1.
Figure 3:
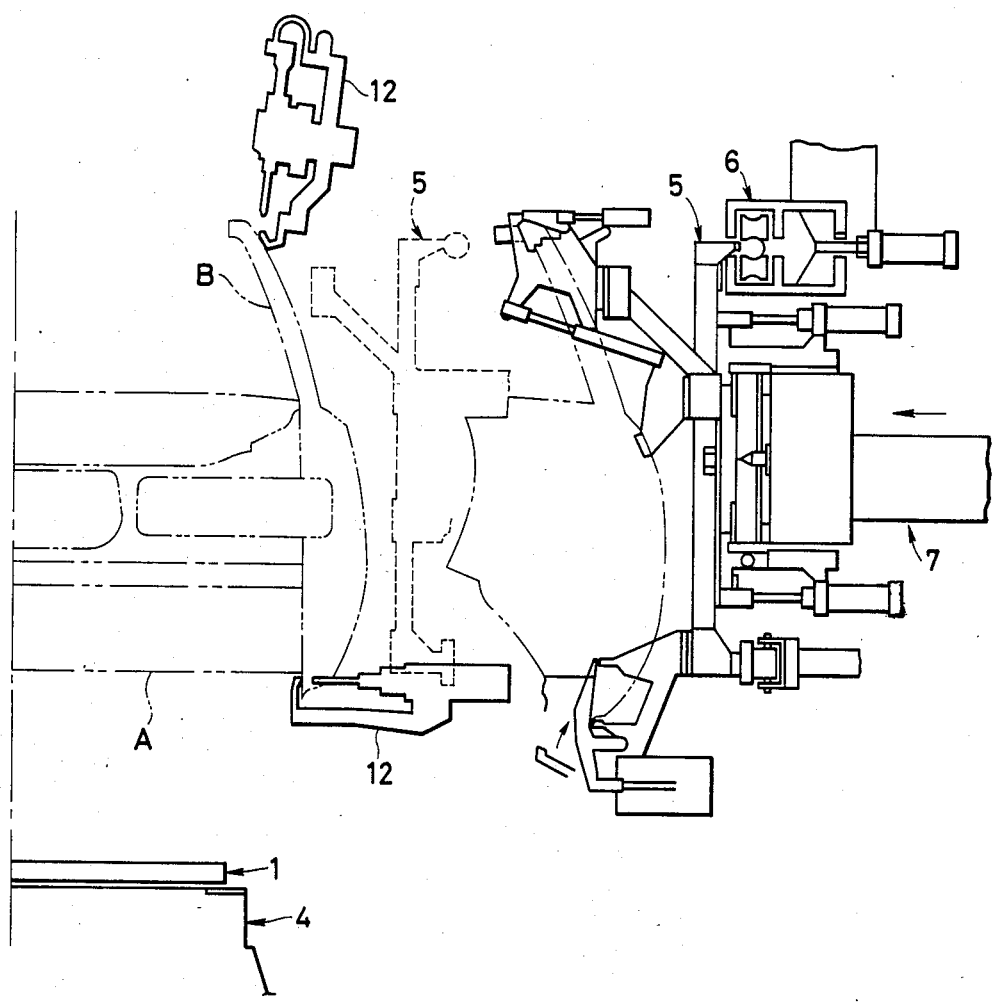
FIG. 3 is an enlarged view showing a portion of FIG. 2.

The present invention will be described in connection with a preferred embodiment thereof with reference to the accompanying drawings.

In FIGS. 1 to 5, reference numeral 1 indicates a first jig unit which is to be loaded with an under body A having been preworked. The first jig unit 1 is brought into a main body assembler (which will be called "body assembling means") 3 by the action of a first conveyor 2 which circulates in a loop. In the body assembler 3, there is mounted a first positioner 4 which moves vertically. The aforementioned first jig unit 1 is transferred onto the first positioner 4 and is positioned by downward movement of the same.

Indicated by reference numeral 5 is one of a pair of second jig units which are to be loaded with preworked side bodies B. The second jig units 5 for the two sides of a car main body are brought into the body assembler 3 by the action of a pair of second conveyors 6 circulating in a loop (only one shown). In the body assembler 3, there are mounted a pair of second positioners 7 (only one shown) which move forward and backward. The aforementioned second jig units 5 are transferred to the corresponding second positioners 7 and are positioned by the forward movement of the second positioner with respect to the under body A. It will be understood that the second jig units 5, the pair of second conveyors 6, and the pair of second positioners 7 are arranged, respectively, for the right and left side bodies.

Indicated at numeral 8 is a third jig unit which is to be loaded with sub-body parts such as a preworked roof C, a cowl D, and an upper back E. The third jig unit 8 is brought in a suspended state into the body assembler 3 by the action of an overhead third conveyor 9. In the superstructure of a framework 3a forming part of the body assembler 3, there is mounted a third positioner 10 which moves vertically. The aforementioned third jig unit 8 is transferred to the third positioner 10 and is positioned by the downward movement of the third positioner with respect to the side bodies B.

Figure 5:
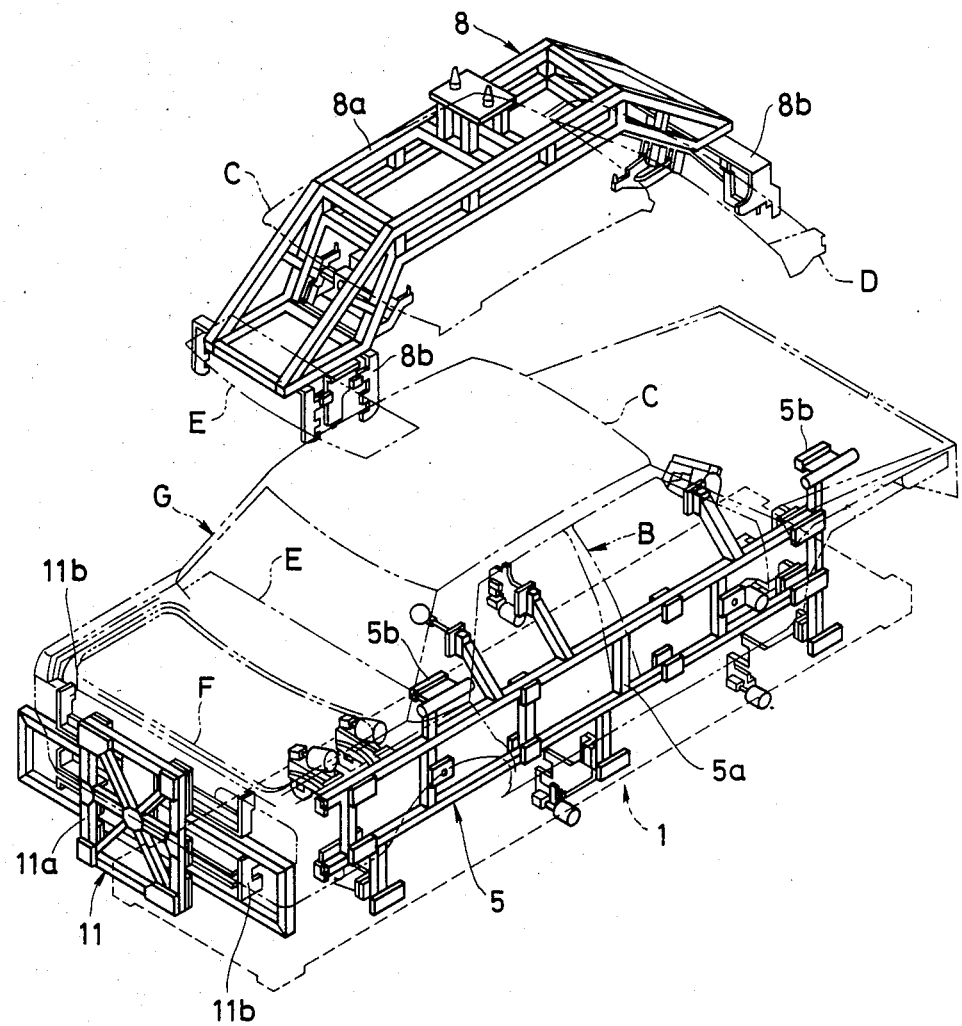
FIG. 5 is a perspective view showing jig units for side bodies and sub-body parts.

The sub-body parts also include a lower back F, for which there is provided a fourth jig unit 11 (see FIG. 5). This fourth jig unit 11 is brought into and positioned in the body assembler 3 by means similar to those of the foregoing third conveyor 9 and positioner 10. Here, the body assembler 3 is equipped with a plurality of industrial robots (or special guns, as the case may be) 13 having welding guns 12 (see FIG. 3), by which the aforementioned positioned body parts are welded to assemble a main body G.

The main body G thus assembled is transferred, while being carried on the first jig unit 1, to the first conveyor 2 and is conveyed to a subsequent step, and the first jig unit 1 is then moved to a subassembly station for preparatory working. Simultaneously, the second jig units 5, the third jig unit 8, and the fourth jig unit 11 are respectively moved to the subassembly station.

Figure 4:
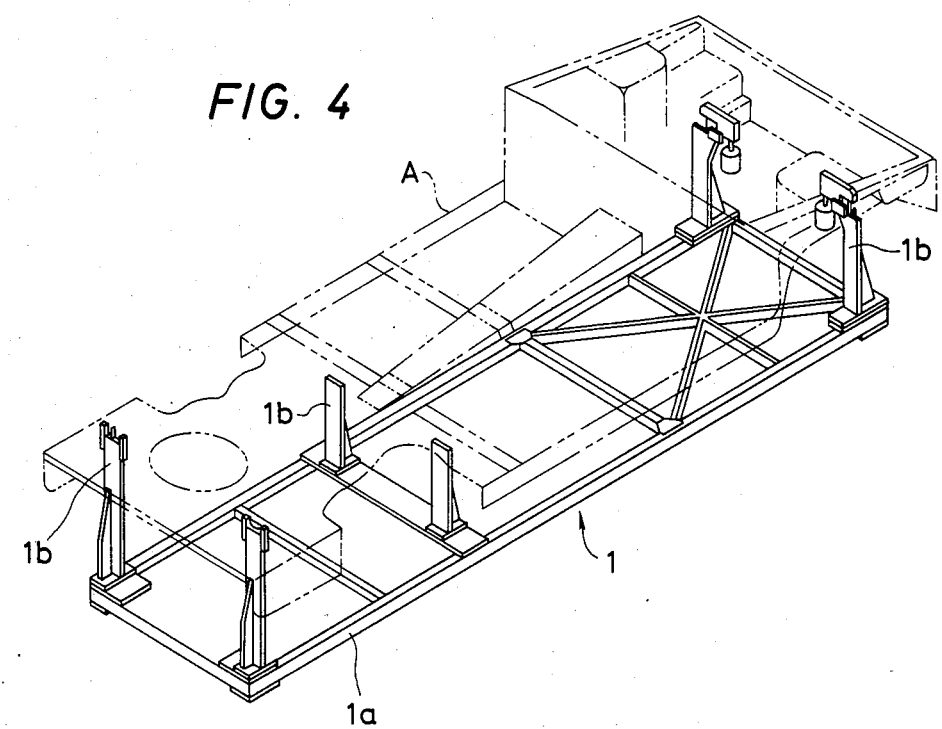
FIG. 4 is a perspective view showing the structure of a jig unit for an under body.

Here, the first jig unit 1 to be loaded with the under body is constructed, as shown in detail in FIG. 4, such that a set of specific jigs 1b for the desired car kind or type are detachably mounted on a frame 1a of a universal (or common) shape that is not dependent upon the car kinds and types. The under body A is placed in position on those jigs 1b.

The second to fourth jig units 5, 8, and 11 are respectively equipped, as shown in detail in FIG. 5, like the first jig unit 1 with universal frames 5a, 8a and 11a on which are removably mounted sets of special jigs 5b, 8b and 11b for the desired kind and type of car.

Figure 6:
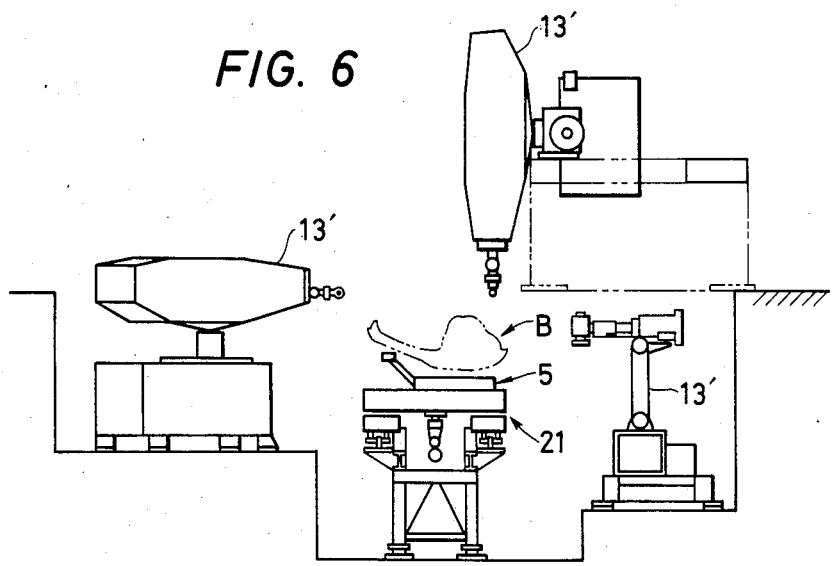
FIG. 6 is a front elevation view of a subassembly station showing preworking means for preworking the side bodies.
Figure 7:
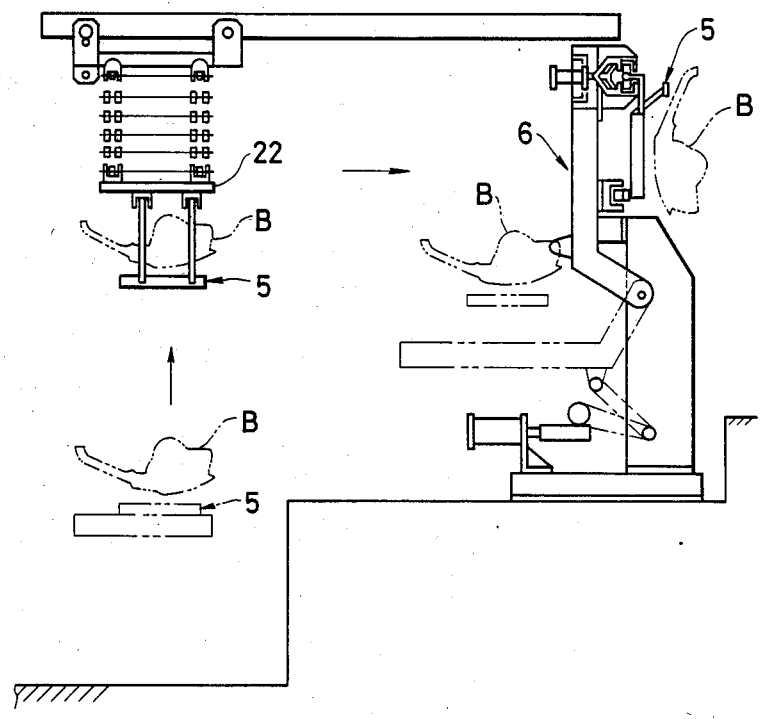
FIG. 7 is a front elevation view showing the conveyed states of the side bodies from the preworking means shown in FIG. 6.
Figure 8:
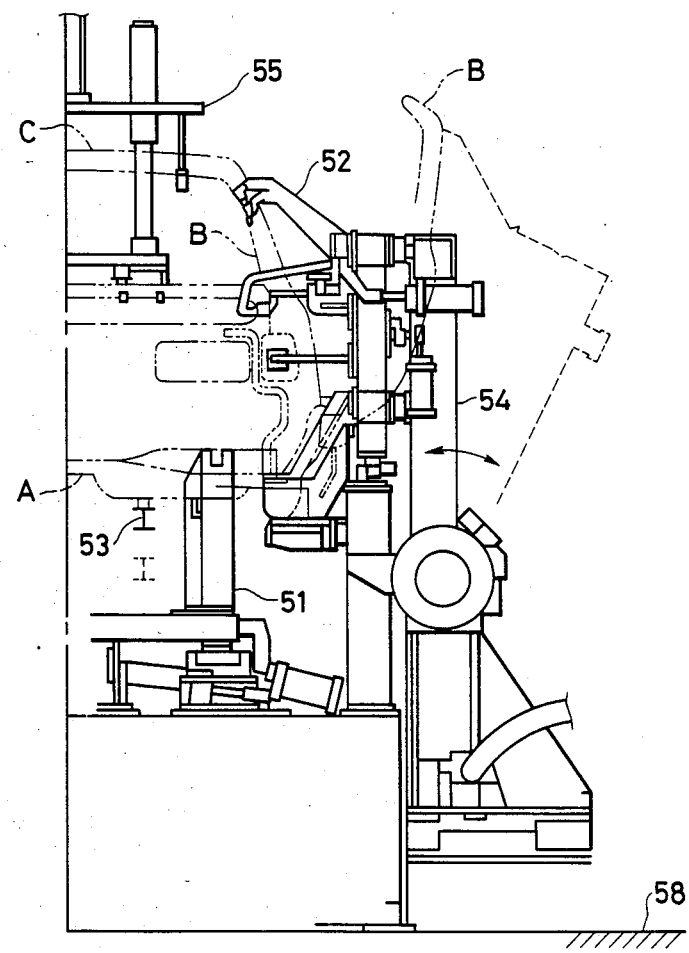
FIG. 8 is a front elevation view showing the structure of an essential portion of the special machine type of car assembling equipment of the prior art.
Figure 9:
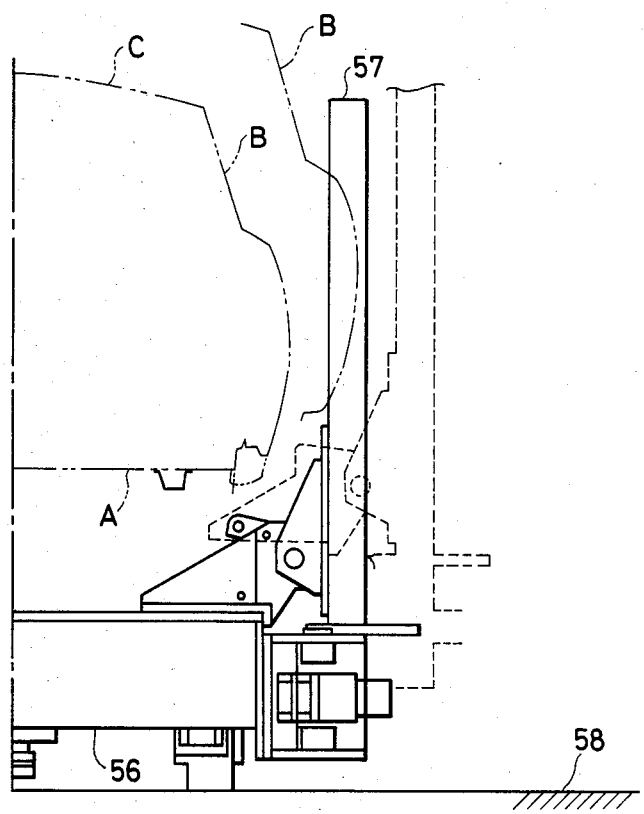
FIG. 9 is similar to FIG. 8 but shows the jig circulating type of car body assembling equipment of the prior art.

Incidentally, the second jig units 5 for the side bodies B are caused to circulate in a loop between the aforementioned body assembler 3 and the preworking subassembly station by the actions of the second conveyors 6. At this subassembly station (as shown in FIG. 6, for example), the side bodies B are assembled (or preworked) directly by industrial robots 13' on the second jig units 5 which are positioned on a conveyor 21. After this, as shown in FIG. 7, the side bodies B are conveyed by a suspended type conveyor 22 to the aforementioned circulating-loop second conveyors 6, to which they are transferred as the second conveyors 6 circulate.

In the car body assembling apparatus having the construction thus far described, the under body A and the side bodies B are carried on the first and second jig units 1 and 5, respectively, and are circulated on conveyor loops between the subassembly station and the body assembler. At suitable times, the under body A and the side bodies B of an intended kind and type of car are brought together with their jig units into the body assembler 3. Also in synchronism, the roof C, the cowl D, and the upper back E are carried on the third jig unit 8 and are moved from the subassembly station; whereas the lower back F is carried on the fourth jig unit 11 and is moved from the subassembly station, until they are brought together with their jig units into the body assembler 3.

The various kinds of the body parts thus brought into the body assembler 3 are positioned by their special positioners (4, 7, 10 and so on) and are then welded to one another by the industrial robots 13, thereby completing the main body G.

The completed main body G is carried on the first jig unit 1 and is conveyed to a subsequent step. Here the main body G is finished and removed from the first jig unit and transferred to a still further step, so that the emptied first jig unit 1 can be recirculated again to the subassembly station by the first conveyor 1. On the other hand, the second to fourth jig units 5, 8 and 11 release the body parts at a time when the working accuracies are achieved, midway during the assembly by the industrial robots 13. The jig units 5, 8 and 11 are then transferred to the conveyors (6, 9 and so on) and are recirculated to the subassembly station.

In the embodiment described above, the assembly of the main body G can be made wholly at one step. However, this step may be divided into a separate step for assembly of the sub-body parts including the lower back F, for example. Moreover, the jig units for the sub-body parts are divided into the aforementioned common third jig unit 8 and the fourth jig unit 11 for the lower back, but they may be divided into a common jig unit for the roof C and the cowl D and a common jig unit for the upper back E and the lower back F, for example. Still further, the jig units (8 and 11) for said sub-body parts clearly may be made to circulate in loops like the jig units (1 and 5) for the under body and the side bodies.

Furthermore, the first to fourth jig units 1, 5, 8 and 11 may be constructed such that they can be detached from one another.

We claim:

1. Apparatus for assembling a car body at one fixed location, the apparatus comprising:
    a plurality of different jig units for a corresponding plurality of different body parts needed for a main body assembly, each jig unit comprised of a universal frame for carrying a corresponding body part for any of a plurality of different kinds and types of cars and a set of jigs for a corresponding body part of a specific kind and type of car body removably mounted on the universal frame;
    said fixed location comprising body assembling means located at a single assembly including
    a corresponding plurality of means for positioning the plurality of different jig units, each of the positioning means being selectively movable between a first position for receiving the universal frame of the corresponding jig unit and a second position for placing a body part carried by the set of jigs mounted on the universal frame in a predetermined assembly position relative to the different body parts carried by the other of the plurality of jig units and
    welding means for welding the body parts together; and
    a plurality of conveyor means for moving said plurality of different jig units between a subassembly station for the corresponding body parts and the first positions of said respective plurality of positioning means in the body assembling means for delivering said jig units to and receiving them from the body assembling means.

2. A car body assembling apparatus according to claim 1, wherein said different jig units comprise separate jig units for an under body, for right and left side bodies, and for other sub-body parts which assemble together to form a car body.

3. A car body assembling apparatus according to claim 1, wherein said plurality of conveyor means include means for circulating jig units in loops.

4. A car body assembling apparatus according to claim 1 wherein said plurality of conveyor means include means for moving jig units reciprocally.

5. A car body assembling apparatus according to claim 1, wherein said welding means includes a plurality of industrial robots.

6. A method for assembling a car body at one stationary body assembly station, the method comprising the steps of:
    loading a plurality of different body parts for a car body onto a corresponding plurality of jig units;
    conveying said jig units to said body assembly station;
    transferring each of said jig units to a corresponding one of a plurality of positioning means at a respective first position of the corresponding positioning means;
    moving each positioning means from its respective first position to a predetermined respective second position such that the different body parts are located in proper position for assembly together;
    welding the different body parts together to form a car body assembly;
    releasing at least some of the jig units from their respective body parts;
    moving each positioning means from its respective second position to the corresponding first position; and
    transferring each jig unit from the corresponding positioning means.

7. A method for assembling a car body according to claim 6, wherein the step of loading a plurality of body parts onto a corresponding plurality of jig units comprises:
    removably mounting a special set of jigs, corresponding to a preselected kind and type of car, on a universal frame for each different body part and
    releasably attaching a corresponding body part to each special set of jigs.

8. A method for assembling a car body according to claim 6 wherein the step of releasing at least some of the jig units from their respective body parts comprises releasing all but one of the jig units.

9. A method for assembling a car body according to claim 6 wherein the step of transferring each of said jig units to and away from the positioning means comprises moving the jig units in a loop between the body assembly station and a body part subassembly station.

10. A method for assembling a car body according to claim 6 wherein the step of transferring each of said jig units to and away from the positioning means comprises moving the jig units in a line between the body assembly station and a body part subassembly station.

* * * * *

UNITED STATES PATENT AND TRADEMARK OFFICE
CERTIFICATE OF CORRECTION

PATENT NO. : 4,667,866
DATED : 26 May 1987
INVENTOR(S) : Hideaki TOBITA et al.

It is certified that error appears in the above-identified patent and that said Letters Patent is hereby corrected as shown below:

| Column | Line | |
|---|---|---|
| 1 | 27: | after "52" delete "one" and insert --only--. |
| 2 | 39: | change "jib" to --jig--. |
| 5 | 44-45: | change "said fixed location comprising body assembling means located at a single assembly including" to --body assembling means located at said fixed location comprising a single assembly station including--. |

Signed and Sealed this

Twentieth Day of October, 1987

Attest:

DONALD J. QUIGG

Attesting Officer

Commissioner of Patents and Trademarks